US012246493B2

(12) United States Patent
Atkinson (10) Patent No.: US 12,246,493 B2
(45) Date of Patent: Mar. 11, 2025

(54) OPTIMIZATION OF AUTOMATED FIBER PLACEMENT

(71) Applicant: Andrew Atkinson, Seattle, WA (US)

(72) Inventor: Andrew Atkinson, Seattle, WA (US)

(*) Notice: Subject to any disclaimer, the term of this patent is extended or adjusted under 35 U.S.C. 154(b) by 188 days.

(21) Appl. No.: 18/182,200

(22) Filed: Mar. 10, 2023

(65) Prior Publication Data

US 2023/0286225 A1    Sep. 14, 2023

Related U.S. Application Data

(60) Provisional application No. 63/333,414, filed on Apr. 21, 2022, provisional application No. 63/319,123, filed on Mar. 11, 2022.

(51) Int. Cl.
*B29C 70/38* (2006.01)
*B29C 70/54* (2006.01)
*B29K 307/04* (2006.01)

(52) U.S. Cl.
CPC ............ *B29C 70/382* (2013.01); *B29C 70/54* (2013.01); *B29K 2307/04* (2013.01)

(58) Field of Classification Search
CPC .... B29C 70/382; B29C 70/54; B29K 2307/04
USPC .......................................................... 156/64
See application file for complete search history.

(56) References Cited

U.S. PATENT DOCUMENTS

2023/0191656 A1*   6/2023   Read .................... D03D 1/00
                                                              264/173.1

* cited by examiner

*Primary Examiner* — James D Sells
(74) *Attorney, Agent, or Firm* — Seed IP Law Group LLP (57) ABSTRACT

Optimizing automated fiber placement in fabrication of a fiber-based laminate includes identifying a plurality of individual tows within a ply of the fiber-based laminate, each of the individual tows having a respective design length, specifying a minimum tow length, identifying a first set of tows that includes each of the individual tows that has a length less than the minimum tow length and that extends to a boundary of the fiber-based laminate, increasing a design length of each of the first set of tows to match the minimum tow length such that each of the first set of tows extends across and beyond a boundary of the fiber-based laminate, identifying a second set of tows that includes each of the individual tows that has a length less than the minimum tow length and that does not extend to a boundary of the fiber-based laminate, and increasing a design length of each of the second set of tows to match the minimum tow length.

17 Claims, 4 Drawing Sheets

OPTIMIZATION OF AUTOMATED FIBER PLACEMENT

BACKGROUND

Technical Field

The present disclosure relates generally to design and fabrication of structures including fiber materials, such as carbon fiber materials, and more specifically to designs of carbon fiber structures that efficiently accommodate minimum fiber lengths in automated fiber placement.

Description of the Related Art

Modern engineered structures often include fiber-based materials, such as carbon fiber materials. Such materials can be advantageous due to their material properties, including their high tensile strength and high overall strength-to-weight ratio, as well as their stability under a wide range of environmental conditions. Nevertheless, such materials can be expensive and, depending on the application, relatively complex to fabricate. Such structures can be referred to as carbon fiber reinforced polymers (CFRP), carbon composites, and/or carbon fiber laminates. In this context, a carbon fiber "laminate" refers to a structure or portion of a structure that includes a plurality of carbon fiber layers or "plies" layered on top of one another. A "ply" refers to a single layer of carbon fibers, where the carbon fibers are generally oriented parallel to one another.

Modern carbon fiber manufacturing techniques often rely on automated robotic systems to lay down individual carbon fiber plies on top of one another. Such robotic systems often include plural carbon fiber spools, from each of which a single "tow" of carbon fibers may be unspooled and laid down on, or applied to, an underlying surface or substrate. In this context, a "tow" refers to a band of plural carbon fibers unspooled and laid down on an underlying surface or substrate from a single carbon fiber spool. A width of a single individual "tow" depends on the characteristics of the spool from which it is unspooled and laid down. Thus, the narrowest tow applicable by a robotic carbon fiber fabrication system generally depends on the dimensions of the spools it carries. Such robotic systems often include plural carbon fiber spools and are typically arranged to lay down plural tows, one from each spool, in a single pass or "sweep" of a head of the robotic system over the underlying surface. Such plural tows are often laid down adjacent to one another, thus forming a single "course" made up of the plural carbon fiber tows applied in a single sweep of the head of the robotic system. An automated robotic system may include any number of spools, with 16 being one specific example, and may be configured to lay down a corresponding number of tows, such as 16 tows, in a single course.

Given the foregoing, it is typically advantageous to optimize designs of carbon fiber laminates for efficient fabrication by such robotic systems, that is, for manufacturability. A design may begin by defining plural super-plies of a carbon fiber laminate. In this context, a "super-ply" refers to a collection of plural stacked individual plies that are arranged at the same orientation as one another. Such super-plies may be arranged, for example, in the order in which they are stacked, as follows: A-B-C-D-D-C-B-A, where both super-plies A are arranged at a first orientation, both super-plies B are arranged at a second orientation 45 degrees from the first orientation, both super-plies C are arranged at a third orientation 45 degrees from the second orientation and 90 degrees from the first orientation, and both super-plies D are arranged at a fourth orientation 45 degrees from the third orientation and 135 degrees from the first orientation. Once plural super-plies have been defined, current design processes often employ at least three steps in designing the carbon fiber laminate and each of its super-plies or individual plies for fabrication by robotic systems.

In a first of these steps, each super-ply may be designed as a "continuous ply" having complete freedom in its thickness. Such designs are typically difficult or impossible to efficiently manufacture, as robotic systems are designed to lay down individual plies of specific thicknesses and may be incapable of laying down a ply of a designed thickness. Thus, in a second step, the designed continuous plies may be broken up or discretized into individual plies that the robotic systems are capable of fabricating. For example, if in the first step a super-ply is designed to have a thickness of 0.391 mm, then in the second step, this super-ply may be discretized into three individual plies each having a thickness of 0.125 mm. In a third step, the order of the discretized plies may be shuffled or rearranged in the stacking direction, such as according to rules or heuristics governing stacking sequences. Such rules or heuristics may include: no more than two plies of the same orientation stacked adjacent to one another; and/or maximize the number of adjacent plies that are oriented at 90 degrees to one another.

BRIEF SUMMARY

A method of optimizing automated fiber placement in fabrication of a fiber-based laminate may be summarized as comprising: identifying a plurality of individual tows within a ply of the fiber-based laminate, each of the individual tows having a respective design length; specifying a minimum tow length; identifying a first set of tows that includes each of the individual tows that has a length less than the minimum tow length and that extends to a boundary of the fiber-based laminate; increasing a design length of each of the first set of tows to match the minimum tow length such that each of the first set of tows extends across and beyond a boundary of the fiber-based laminate; identifying a second set of tows that includes each of the individual tows that has a length less than the minimum tow length and that does not extend to a boundary of the fiber-based laminate; and increasing a design length of each of the second set of tows to match the minimum tow length.

Increasing the design length of each of the second set of tows to match the minimum tow length may include increasing the design length of each of the second set of tows symmetrically. Increasing the design length of each of the second set of tows to match the minimum tow length may include increasing the design length of each of the second set of tows asymmetrically. The method may further comprise fabricating the fiber-based laminate, including using an automated robotic system to lay down the first and second sets of tows having the increased design lengths. The method may further comprise: defining a plurality of super-plies; designing each of the super-plies as a continuous ply; discretizing each of the continuous plies into smaller individual plies; and rearranging the individual plies in a stacking direction.

A method of optimizing automated fiber placement in fabrication of a fiber-based laminate may be summarized as comprising: identifying a plurality of individual tows within a ply of the fiber-based laminate, each of the individual tows having a respective design length; specifying a minimum tow length; identifying a first set of tows that includes each of the individual tows that has a length less than the minimum tow length and that extends to a boundary of the fiber-based laminate; increasing a design length of each of the first set of tows to match the minimum tow length such that each of the first set of tows extends across and beyond a boundary of the fiber-based laminate; identifying a second set of tows that includes each of the individual tows that has a length less than the minimum tow length and that does not extend to a boundary of the fiber-based laminate; and increasing a design length of each of the second set of tows to match the minimum tow length.

Increasing the design length of each of the second set of tows to match the minimum tow length may include increasing the design length of each of the second set of tows symmetrically. The method may further include, after the design length of each of the second set of tows is increased symmetrically: checking a tow of the second set of tows to determine whether either end of the tow extends to a boundary of the fiber-based laminate; and if an end of the tow extends to a boundary of the fiber-based laminate, then modifying the increase in the design length of the tow such that the design length is increased only at the end of the tow that extends to the boundary. The method may further include, after the design length of each of the second set of tows is increased symmetrically: checking a tow of the second set of tows to determine whether either end of the tow extends to a boundary of the fiber-based laminate; and if both ends of the tow extend to a boundary of the fiber-based laminate, then modifying the increase in the design length of the tow such that the design length is increased only at one of the ends of the tow to minimize a portion of the design length of the tow that is within boundaries of the fiber-based laminate.

Increasing the design length of each of the second set of tows to match the minimum tow length may include increasing the design length of each of the second set of tows asymmetrically. Increasing a design length of a tow of the second set of tows may include: modifying the design length of the tow such that the tow is extended at a first end of the tow and not at a second end of the tow and then checking the tow to determine whether the first end of the tow extends to a boundary of the fiber-based laminate and whether the first end of the tow extends across a gap in the fiber-based laminate; and modifying the design length of the tow such that the tow is extended at the second end of the tow and not at the first end of the tow and then checking the tow to determine whether the second end of the tow extends to a boundary of the fiber-based laminate and whether the second end of the tow extends across a gap in the fiber-based laminate. When the first end of the tow, when extended, extends to a boundary of the fiber-based laminate or across a gap, and the second end of the tow, when extended, does not extend to a boundary of the fiber-based laminate or across a gap, then the design length of the tow may be modified such that the design length of the tow is extended only at the first end and not at the second end. When the first end of the tow, when extended, extends to a boundary of the fiber-based laminate or across a gap, and the second end of the tow, when extended, extends to a boundary of the fiber-based laminate or across a gap, the design length of the tow may be modified such that the design length of the tow is extended only at one of the ends of the tow to minimize a portion of the design length of the tow that is within boundaries of the fiber-based laminate.

The method may further comprise fabricating the fiber-based laminate, including using an automated robotic system to lay down the first and second sets of tows having the increased design lengths. The method may further comprise: defining a plurality of super-plies; designing each of the super-plies as a continuous ply; discretizing each of the continuous plies into smaller individual plies; and rearranging the individual plies in a stacking direction. The fiber-based laminate may be a carbon fiber laminate. The minimum tow length may be between 75 and 100 mm.

A method of designing and fabricating a fiber-based laminate may be summarized as comprising: identifying, within an initial design of a ply of the fiber-based laminate, a plurality of individual tows, each of the individual tows having a respective design length; identifying, within the initial design of the ply of the fiber-based laminate, a first set of tows that includes each of the individual tows that has a length less than a specified minimum tow length and that extends to a boundary of the fiber-based laminate; increasing a design length of each of the first set of tows to match the specified minimum tow length such that each of the first set of tows extends across and beyond a boundary of the fiber-based laminate; identifying, within the initial design of the ply of the fiber-based laminate, a second set of tows that includes each of the individual tows that has a length less than the specified minimum tow length and that does not extend to a boundary of the fiber-based laminate; modifying a design of each of the second set of tows such that none of the plurality of individual tows has a length less than the specified minimum tow length; and fabricating the fiber-based laminate, including using an automated robotic system to lay down the first and second sets of tows.

Modifying a design of each of the second set of tows may include: identifying a first subset of the second set of tows that includes each of the second set of tows that has a length less than a first specified lower bound threshold; removing each of the first subset of the second set of tows from the initial design of the ply of the fiber-based laminate to create a preliminary design of the ply of the fiber-based laminate; and testing the preliminary design of the ply of the fiber-based laminate to check compliance with design requirements. The method may further comprise, when the preliminary design of the ply of the fiber-based laminate is found to not comply with design requirements: identifying a second subset of the second set of tows that includes each of the second set of tows that has a length less than a second specified lower bound threshold, wherein the second specified lower bound threshold is less than the first specified lower bound threshold; identifying a third subset of the second set of tows that includes each of the second set of tows that has a length greater than the second specified lower bound threshold; creating an updated design of the ply of the fiber-based laminate by removing each of the second subset of the second set of tows from the initial design of the ply of the fiber-based laminate and increasing a design length of each of the third subset of the second set of tows to match the minimum tow length; and testing the updated design of the ply of the fiber-based laminate to check compliance with design requirements.

The method may further comprise repeating the actions of identifying the second and third subsets of the second set of tows, creating an updated design, and testing the updated design until the updated design complies with design requirements, wherein additional specified lower bound thresholds are selected in accordance with a bisection search technique. The initial design of a ply of the fiber-based laminate may be an initial design of a first ply of the fiber-based laminate and the method may further comprise: for an initial design of a second ply of the fiber-based laminate, repeating the actions of identifying a plurality of individual tows, identifying first and second sets of tows from the plurality of individual tows, and modifying designs of the first and second sets of tows; wherein a value of a specified lower bound threshold when an updated design of the first ply of the fiber-based laminate is found to comply with design requirements is different than a value of a specified lower bound threshold when an updated design of the second ply of the fiber-based laminate is found to comply with design requirements.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Given the nature of automated robotic carbon fiber fabrication systems, there is often a minimum tow length applicable by a robotic system. That is, each tow must be at least as long as a specified minimum tow length. Such a minimum tow length may be greater than 20, 30, 40, 50, 60, 70, 80, or 90 mm and/or less than 80, 90, 100, 110, 120, 130, 140, or 150 mm. In some specific embodiments, a minimum tow length may be between 75 and 100 mm. The methods described herein can be used to optimize the design of carbon fiber laminates based on advance knowledge of such a minimum tow length. For example, a method of designing a carbon fiber laminate, as described herein, may comprise defining a plurality of super-plies which together form the carbon fiber laminate. Next, the super-plies may be designed as "continuous plies" having complete freedom in their thicknesses. Then, the designed continuous plies may be broken up or discretized into individual plies that robotic systems are capable of fabricating. Once individual plies have been designed in this manner, the methods described herein include designing tows within each of the individual plies such that each tow has a length greater than or equal to a minimum tow length. In doing so, the methods may seek to, or may actually, minimize a difference between an optimal design in the absence of a minimum tow length and a manufacturable design given the existence of a minimum tow length. Finally, an order of the individual plies may be rearranged in a stacking direction, such as according to various rules or heuristics governing stacking sequences.

Figure 1:
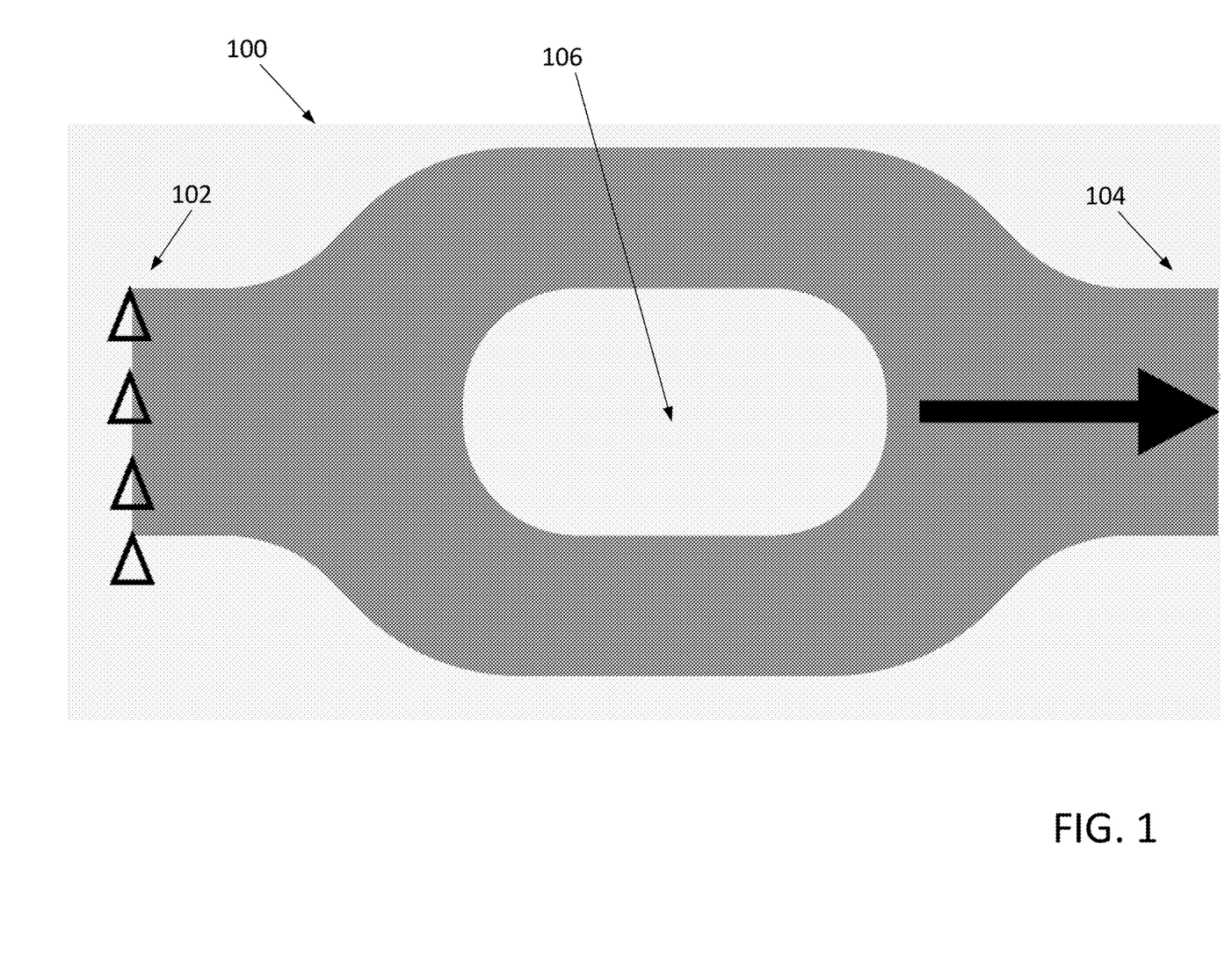
FIG. 1 illustrates an overall shape of a carbon fiber laminate in a plan view.

FIG. 1 illustrates an overall shape of a carbon fiber laminate 100. In particular, FIG. 1 illustrates that the carbon fiber laminate 100 has a first end 102, which may be designed to be mechanically supported when in use, and a second end 104 opposite the first end 102, which may be designed to be mechanically loaded when in use. The carbon fiber laminate 100 has an overall profile including an opening or aperture 106 at its center. A method of designing the carbon fiber laminate 100 includes defining a plurality of super-plies, designing each of the super-plies as a continuous ply having complete freedom in its thickness, and then discretizing each of the continuous plies into smaller individual plies that robotic systems are capable of fabricating. Each of the smaller individual plies may then be designed, at least in part, as follows.

First, a minimum tow length may be specified. The minimum tow length may represent the smallest length of carbon fiber that can be applied by an automated carbon fiber manufacturing system or an automated robotic system thereof. Thus, the minimum tow length represents a smallest manufacturable length of a carbon fiber tow. The minimum tow length may be input directly by a human operator of a computer software program, may be received from another software program, or may be selected as a default or common minimum tow length known in the industry.

Figure 2:
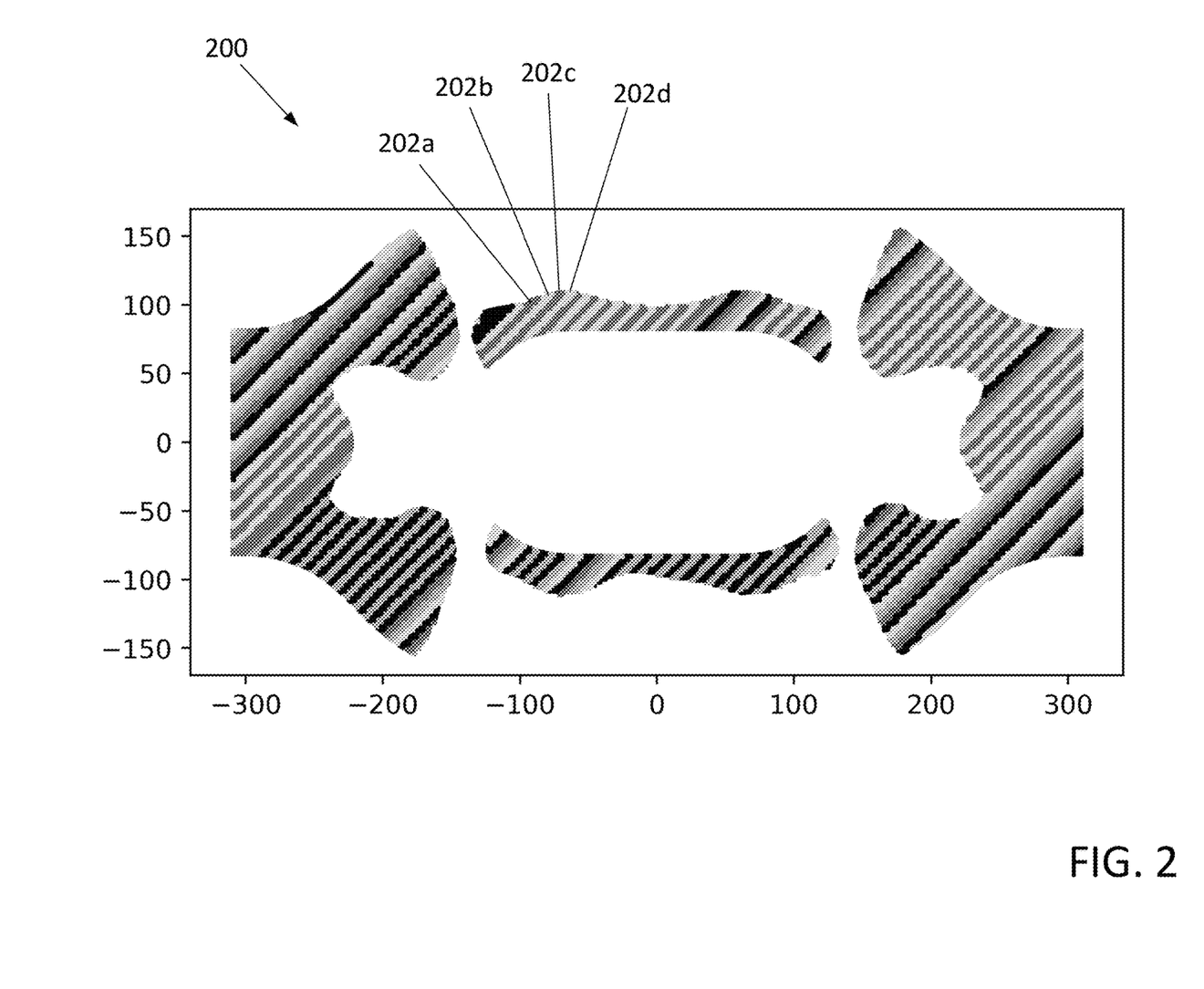
FIG. 2 illustrates a ply of a carbon fiber laminate divided into plural idealized tows. Numbers along axes are millimeter markings, with zero representing a center of the ply, such that the ply is about 600 mm long in a direction of the horizontal axis and about 300 mm wide in a direction of the vertical axis.

FIG. 2 illustrates a single smaller individual ply 200 discretized from a larger super-ply. In particular, FIG. 2 illustrates that the ply 200 is broken up into a plurality of individual tows 202a, 202b, 202c. 202d, etc. In FIG. 2, adjacent individual tows 202 are illustrated in different shades of gray so that they are more easily distinguishable. Further, in FIG. 2, each of the individual tows 202 is oriented at a 45 degree angle with respect to an overall length of the carbon fiber laminate 100 extending from the first end 102 to the second end 104 thereof. Other individual plies within the carbon fiber laminate 100 have different orientations than the tows 202 of the ply 200, but the techniques and principles discussed herein for ply 200 can apply to each of the plies in the carbon fiber laminate 100 regardless of their orientation. FIG. 2 also illustrates that the ply 200 does not cover the entire extent of the carbon fiber laminate 100. That is, there are regions of the carbon fiber laminate 100 that, when viewed in a plan view as in FIG. 1, the ply 200 and its individual tows 202 do not extend across. In FIG. 2 and in general, multiple distinct "tows" may be aligned with one another on a common axis. For example, a first tow may be positioned on a first side of an opening or aperture (e.g., aperture 106) and a second tow may be positioned on an opposing second side thereof, where the two distinct tows might have been a single tow if not for the interruption caused by the opening or aperture.

Figure 3:
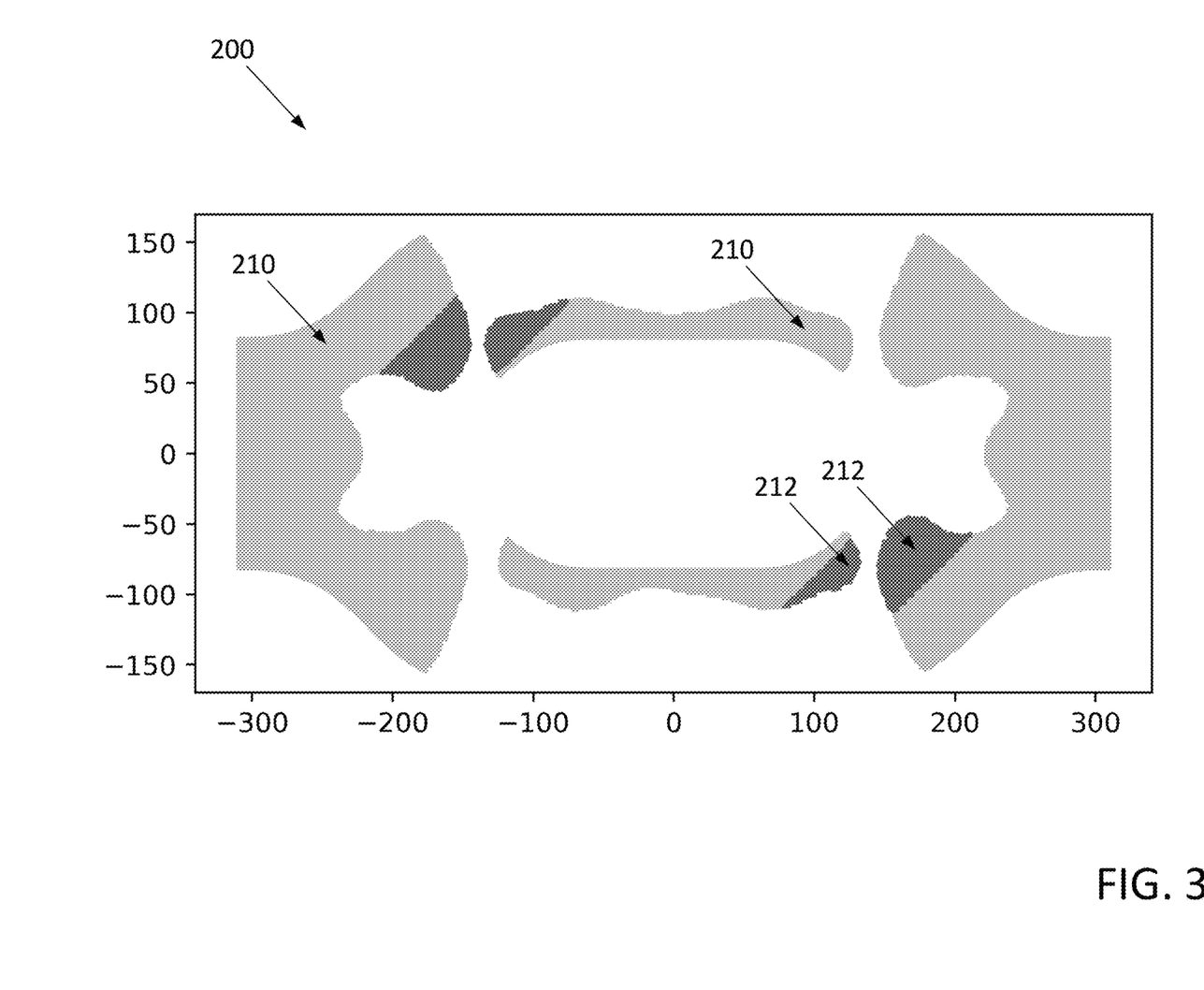
FIG. 3 illustrates the ply of a carbon fiber laminate of FIG. 2 divided into first tows that both do not touch or extend to a boundary of the laminate and have a length less than a minimum tow length and second tows that either touch or extend to a boundary of the laminate or have a length greater than a minimum tow length. Numbers along axes are millimeter markings, with zero representing a center of the ply, such that the ply is about 600 mm long in a direction of the horizontal axis and about 300 mm wide in a direction of the vertical axis.

FIG. 3 illustrates the ply 200 in different colors than in FIG. 2. In particular, FIG. 3 illustrates the ply 200 with a first set of tows 210 illustrated in a lighter gray and a second set of tows 212 illustrated in a darker gray. All of the tows 202 in the ply 200 are in either the first set of tows 210 or the second set of tows 212. In FIG. 3, the first set of tows 210 illustrated in lighter gray are tows that extend to an outer boundary of the laminate 100, have a length greater than a minimum tow length, or both. These are tows that are manufacturable by automated robotic systems. In particular, many individual tows that have a length less than the minimum tow length are manufacturable if they extend to an outer boundary of the laminate 100 because their length can extend outside the outer boundary while the plies are being laid down, and they can be trimmed at the boundary later. In FIG. 3, the second set of tows 212 illustrated in darker gray are tows that do not extend to an outer boundary of the laminate 100 and that have a length less than a minimum tow length. These are tows that are not manufacturable by automated robotic systems. Because of the symmetries in the shape of the carbon fiber laminate 100, the lighter and darker gray regions in FIG. 3 have 180-degree rotational symmetry, although such regions in other plies may not have such symmetry, may not have any symmetry, or may have different symmetry.

Figure 4:
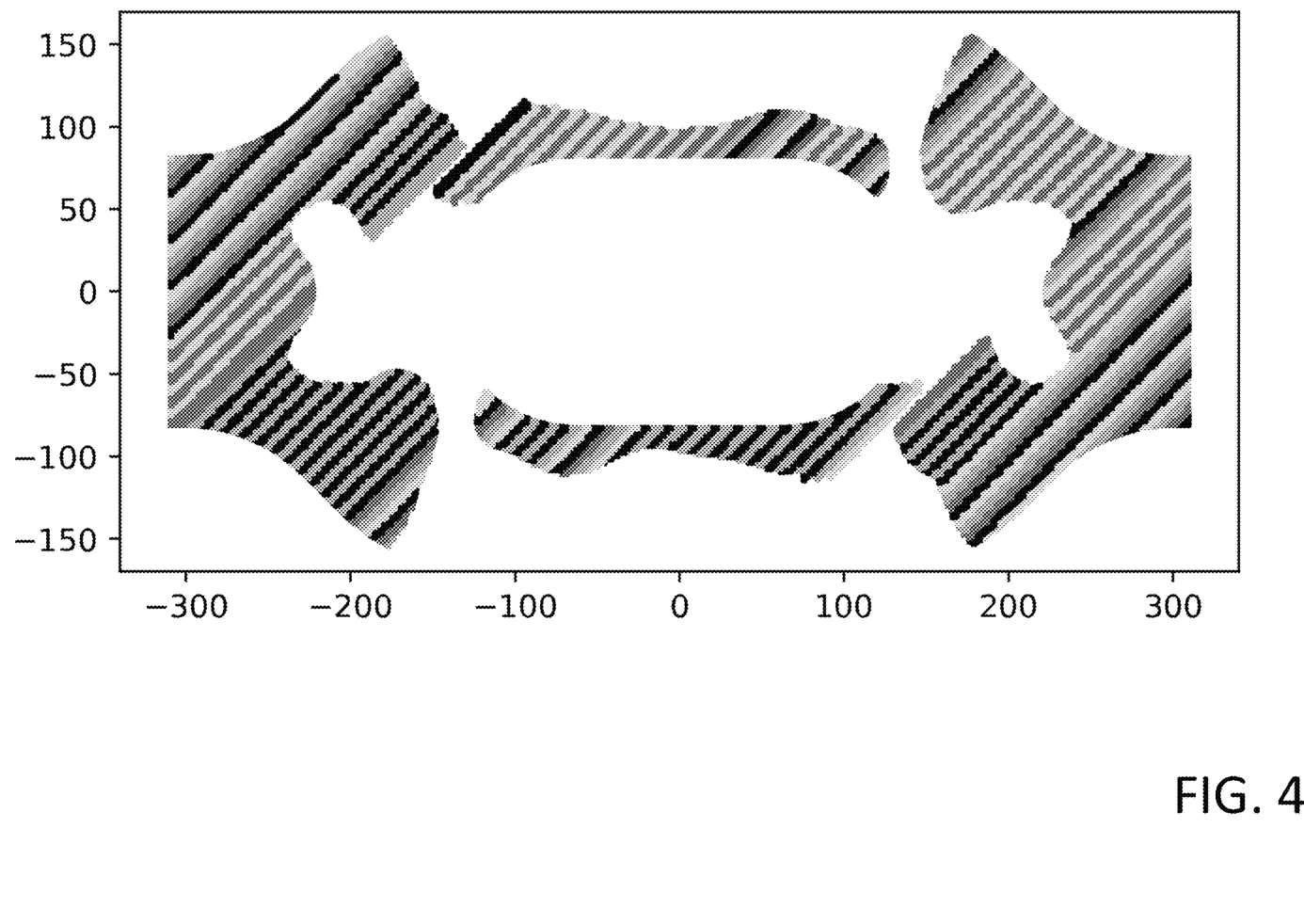
FIG. 4 illustrates the ply of a carbon fiber laminate of FIG. 2 divided into plural manufacturable tows. Numbers along axes are millimeter markings, with zero representing a center of the ply, such that the ply is about 600 mm long in a direction of the horizontal axis and about 300 mm wide in a direction of the vertical axis.

FIG. 4 illustrates the ply 200 divided into plural manufacturable tows, which can be compared to FIG. 2, which illustrates the ply 200 divided into plural idealized tows. In particular, FIG. 4 differs from FIG. 2 at least in that some of the individual tows 200 illustrated therein have been elongated or lengthened relative to their length as illustrated in FIG. 2. For example, any tow 200 that, as illustrated in FIG. 2, has a length less than the minimum tow length and does not extend to an outer boundary of the laminate 100, is extended equally at both ends (that is, symmetrically about the center of its own overall length) until its length is equal to the minimum tow length. Any tow 200 that, as illustrated in FIG. 2, has a length less than the minimum tow length, and that extends to an outer boundary of the laminate 100, may, during manufacturing, be extended beyond the boundary (e.g., into the aperture 106) until its length is equal to the minimum tow length, although such extension is not illustrated in FIG. 4.

Increasing the lengths of all tows 200 that, as illustrated in FIG. 2, have a length less than the minimum tow length and do not extend to an outer boundary of the laminate 100 to the minimum tow length may lead to addition of excessive carbon fiber materials to the laminate 100 and can therefore be inefficient. Thus, in some cases, a lower bound or threshold is applied to the lengths of the individual tows 200 in their ideal form as illustrated in FIG. 2. For example, an initial lower bound may be set to 100 percent of the minimum tow length. All tows 200 that, as illustrated in FIG. 2, have a length less than 100 percent of the minimum tow length and do not extend to an outer boundary of the laminate 100 may be deleted or otherwise removed from the design, resulting in a preliminary ply design. This preliminary ply design can then be analyzed and tested, such as by using finite element analysis software, to ensure that the preliminary design satisfies all design requirements.

If the preliminary design is found to not satisfy all design requirements, then the initial lower bound may be incremented and the process repeated. For example, the lower bound may then be set to 90 percent of the minimum tow length. All tows 200 that, as illustrated in FIG. 2, have a length less than 90 percent of the minimum tow length and do not extend to an outer boundary of the laminate 100 are deleted or otherwise removed from the design, while the tows 200 that, as illustrated in FIG. 2, have a length greater than 90 percent of the minimum tow length but less than the minimum tow length and do not extend to an outer boundary of the laminate 100 are extended symmetrically at each end until their length is equal to the minimum tow length, resulting in another preliminary ply design. This preliminary ply design can then be analyzed and tested, such as by using finite element analysis software, to ensure that the preliminary design satisfies all design requirements.

If this preliminary design is found to not satisfy all design requirements, then the initial lower bound may be incremented and the process repeated. For example, the lower bound may be set to 80 percent of the minimum tow length. All tows 200 that, as illustrated in FIG. 2, have a length less than 80 percent of the minimum tow length and do not extend to an outer boundary of the laminate 100 are deleted or otherwise removed from the design, while the tows 200 that, as illustrated in FIG. 2, have a length greater than 80 percent of the minimum tow length but less than the minimum tow length and do not extend to an outer boundary of the laminate 100 are extended symmetrically at each end until their length is equal to the minimum tow length, resulting in another preliminary ply design. This preliminary ply design can then be analyzed and tested, such as by using finite element analysis software, to ensure that the preliminary design satisfies all design requirements.

If the preliminary design is found to not satisfy all design requirements, then the initial lower bound may be incremented and the process repeated, such as by setting the lower bound to 70 percent of the minimum tow length. This process may be repeated, and the lower bound may be repeatedly incremented in this fashion, until it is found that a preliminary ply design satisfies all design requirements. The first preliminary ply design found to satisfy all design requirements may then be designated as a final ply design. This process can be repeated for each individual ply in the carbon fiber composite 100, and the final or effective lower bound may be different for each ply. In some embodiments, a preliminary ply design may be designated as a final ply design when the lower bound is set to between about 40 percent and about 70 percent of the minimum tow length.

The foregoing methods include incrementing the lower bound threshold until a preliminary ply design is found to satisfy all design requirements. In alternative embodiments, however, the lower bound threshold can be varied through iterations in accordance with bisection search techniques. For example, the lower bound can initially be set to 100 percent, then to 50 percent, then to 75 percent, then to 62.5 percent, and continue this way in accordance with bisection search techniques, such as for a predetermined number of iterations, with a preliminary ply designed in accordance with the lowest lower bound threshold that is still found to satisfy all design requirements being designated as the final ply design. In other embodiments, other methods can be used, such as gradient descent techniques or simplex algorithms.

In some implementations, increasing a length of a tow 200 that, as illustrated in FIG. 2, has a length less than the minimum tow length and does not extend to an outer boundary of the laminate 100, can be done asymmetrically. For example, a length of such a tow 200 may be initially increased symmetrically as described herein. The tow may then be checked to determine whether either end of the tow, having the increased length, extends to a boundary of the carbon fiber laminate 100. If it is found that a first end of the tow now extends to a boundary of the carbon fiber laminate 100, then the tow may be revised such that its length is increased only at the first end and not at the second end. If it is found that a first end and an opposite second end of the tow now both extend to a boundary of the carbon fiber laminate 100, then the tow may be revised such that its length is either increased only at the first end and not at the second end or increased only at the second end and not at the first end, depending on which of these options minimizes the length of the tow within the boundaries of the carbon fiber laminate 100.

As another example, an initial length of such a tow 200 may be initially increased asymmetrically by adding to the length of the tow at the first end thereof. The tow may then be checked to determine whether the first end of the tow, having the increased length, extends to a boundary of the carbon fiber laminate 100 and/or extends to another portion of the tow or ply across a gap in the tow or ply. The initial length of the tow 200 may be then be increased asymmetrically by adding to the length of the tow at the second end thereof. The tow may then be checked to determine whether the second end of the tow, having the increased length, extends to a boundary of the carbon fiber laminate 100 and/or extends to another portion of the tow or ply across a gap in the tow or ply. If it is found that the first end of the tow, when extended, extends to a boundary of the carbon fiber laminate 100 and/or extends to another portion of the tow or ply across a gap in the tow or ply, and the second end of the tow, when extended, does not extend to a boundary of the carbon fiber laminate 100 and/or to another portion of the tow or ply across a gap in the tow or ply, then the tow may be revised such that its length is increased only at the first end and not at the second end. If it is found that the second end of the tow, when extended, extends to a boundary of the carbon fiber laminate 100 and/or extends to another portion of the tow or ply across a gap in the tow or ply, and the first end of the tow, when extended, does not extend to a boundary of the carbon fiber laminate 100 and/or to another portion of the tow or ply across a gap in the tow or ply, then the tow may be revised such that its length is increased only at the second end and not at the first end. If it is found that the first end of the tow, when extended, extends to a boundary of the carbon fiber laminate 100 and/or extends to another portion of the tow or ply across a gap in the tow or ply, and the second end of the tow, when extended, also extends to a boundary of the carbon fiber laminate 100 and/or extends to another portion of the tow or ply across a gap in the tow or ply, then the tow may be revised such that its length is increased only at the first end or only at the second end, depending on which of these options minimizes the length of the tow within the boundaries of the carbon fiber laminate 100.

Once each of the plies and their respective tows are designed in this manner, an order of the individual plies may be rearranged in a stacking direction, such as according to various rules or heuristics governing stacking sequences. Once this has been completed, the carbon fiber laminate 100 can be fabricated, such as by using an automated robotic system to lay down the carbon fiber material of the various plies, according to the designs as described herein.

U.S. provisional patent application No. 63/319,123, filed Mar. 11, 2022, and U.S. provisional patent application No. 63/333,414, filed Apr. 21, 2022, to which this application claims priority, are hereby incorporated herein by reference, in their entireties. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of optimizing automated fiber placement in fabrication of a fiber-based laminate, comprising:
   identifying a plurality of individual tows within a ply of the fiber-based laminate, each of the individual tows having a respective design length;
   specifying a minimum tow length;
   identifying a first set of tows that includes each of the individual tows that has a length less than the minimum tow length and that extends to a boundary of the fiber-based laminate;
   increasing a design length of each of the first set of tows to match the minimum tow length such that each of the first set of tows extends across and beyond a boundary of the fiber-based laminate;
   identifying a second set of tows that includes each of the individual tows that has a length less than the minimum tow length and that does not extend to a boundary of the fiber-based laminate; and
   increasing a design length of each of the second set of tows to match the minimum tow length.

2. The method of claim 1 wherein increasing the design length of each of the second set of tows to match the minimum tow length includes increasing the design length of each of the second set of tows symmetrically.

3. The method of claim 2 wherein, after the design length of each of the second set of tows is increased symmetrically:
   checking a tow of the second set of tows to determine whether either end of the tow extends to a boundary of the fiber-based laminate; and
   if an end of the tow extends to a boundary of the fiber-based laminate, then modifying the increase in the design length of the tow such that the design length is increased only at the end of the tow that extends to the boundary.

4. The method of claim 2 wherein, after the design length of each of the second set of tows is increased symmetrically:
   checking a tow of the second set of tows to determine whether either end of the tow extends to a boundary of the fiber-based laminate; and
   if both ends of the tow extend to a boundary of the fiber-based laminate, then modifying the increase in the design length of the tow such that the design length is increased only at one of the ends of the tow to minimize a portion of the design length of the tow that is within boundaries of the fiber-based laminate.

5. The method of claim 1 wherein increasing the design length of each of the second set of tows to match the minimum tow length includes increasing the design length of each of the second set of tows asymmetrically.

6. The method of claim 5 wherein increasing a design length of a tow of the second set of tows includes:
   modifying the design length of the tow such that the tow is extended at a first end of the tow and not at a second end of the tow and then checking the tow to determine whether the first end of the tow extends to a boundary of the fiber-based laminate and whether the first end of the tow extends across a gap in the fiber-based laminate; and
   modifying the design length of the tow such that the tow is extended at the second end of the tow and not at the first end of the tow and then checking the tow to determine whether the second end of the tow extends to a boundary of the fiber-based laminate and whether the second end of the tow extends across a gap in the fiber-based laminate.

7. The method of claim 6 wherein, when the first end of the tow, when extended, extends to a boundary of the fiber-based laminate or across a gap, and the second end of the tow, when extended, does not extend to a boundary of the fiber-based laminate or across a gap, then the design length of the tow is modified such that the design length of the tow is extended only at the first end and not at the second end.

8. The method of claim 6 wherein, when the first end of the tow, when extended, extends to a boundary of the fiber-based laminate or across a gap, and the second end of the tow, when extended, extends to a boundary of the fiber-based laminate or across a gap, the design length of the tow is modified such that the design length of the tow is extended only at one of the ends of the tow to minimize a portion of the design length of the tow that is within boundaries of the fiber-based laminate.

9. The method of claim 1, further comprising fabricating the fiber-based laminate, including using an automated robotic system to lay down the first and second sets of tows having the increased design lengths.

10. The method of claim 1, further comprising:
defining a plurality of super-plies;
designing each of the super-plies as a continuous ply;
discretizing each of the continuous plies into smaller individual plies; and
rearranging the individual plies in a stacking direction.

11. The method of claim 1 wherein the fiber-based laminate is a carbon fiber laminate.

12. The method of claim 1 wherein the minimum tow length is between 75 and 100 mm.

13. A method of designing and fabricating a fiber-based laminate, comprising:
identifying, within an initial design of a ply of the fiber-based laminate, a plurality of individual tows, each of the individual tows having a respective design length;
identifying, within the initial design of the ply of the fiber-based laminate, a first set of tows that includes each of the individual tows that has a length less than a specified minimum tow length and that extends to a boundary of the fiber-based laminate;
increasing a design length of each of the first set of tows to match the specified minimum tow length such that each of the first set of tows extends across and beyond a boundary of the fiber-based laminate;
identifying, within the initial design of the ply of the fiber-based laminate, a second set of tows that includes each of the individual tows that has a length less than the specified minimum tow length and that does not extend to a boundary of the fiber-based laminate;
modifying a design of each of the second set of tows such that none of the plurality of individual tows has a length less than the specified minimum tow length; and
fabricating the fiber-based laminate, including using an automated robotic system to lay down the first and second sets of tows.

14. The method of claim 13 wherein modifying a design of each of the second set of tows includes:
identifying a first subset of the second set of tows that includes each of the second set of tows that has a length less than a first specified lower bound threshold;
removing each of the first subset of the second set of tows from the initial design of the ply of the fiber-based laminate to create a preliminary design of the ply of the fiber-based laminate; and
testing the preliminary design of the ply of the fiber-based laminate to check compliance with design requirements.

15. The method of claim 14, further comprising, when the preliminary design of the ply of the fiber-based laminate is found to not comply with design requirements:
identifying a second subset of the second set of tows that includes each of the second set of tows that has a length less than a second specified lower bound threshold, wherein the second specified lower bound threshold is less than the first specified lower bound threshold;
identifying a third subset of the second set of tows that includes each of the second set of tows that has a length greater than the second specified lower bound threshold;
creating an updated design of the ply of the fiber-based laminate by removing each of the second subset of the second set of tows from the initial design of the ply of the fiber-based laminate and increasing a design length of each of the third subset of the second set of tows to match the minimum tow length; and
testing the updated design of the ply of the fiber-based laminate to check compliance with design requirements.

16. The method of claim 15, further comprising repeating the actions of identifying the second and third subsets of the second set of tows, creating an updated design, and testing the updated design until the updated design complies with design requirements, wherein additional specified lower bound thresholds are selected in accordance with a bisection search technique.

17. The method of claim 16 wherein the initial design of a ply of the fiber-based laminate is an initial design of a first ply of the fiber-based laminate and the method further comprises:
for an initial design of a second ply of the fiber-based laminate, repeating the actions of identifying a plurality of individual tows, identifying first and second sets of tows from the plurality of individual tows, and modifying designs of the first and second sets of tows;
wherein a value of a specified lower bound threshold when an updated design of the first ply of the fiber-based laminate is found to comply with design requirements is different than a value of a specified lower bound threshold when an updated design of the second ply of the fiber-based laminate is found to comply with design requirements.

* * * * *